Dec. 10, 1940.  D. W. SESSIONS  2,224,526

FLUID PRESSURE APPARATUS

Filed June 26, 1939  2 Sheets-Sheet 1

INVENTOR
D. W. SESSIONS
By
Young, Emery & Thompson
ATTYS.

Dec. 10, 1940.  D. W. SESSIONS  2,224,526
FLUID PRESSURE APPARATUS
Filed June 26, 1939  2 Sheets-Sheet 2

INVENTOR
D.W. SESSIONS
BY
Young, Emery & Thompson
ATTYS.

Patented Dec. 10, 1940

2,224,526

UNITED STATES PATENT OFFICE 2,224,526

FLUID PRESSURE APPARATUS

Donald Wilfred Sessions, Mill Hill, London, England, assignor to Smith's Jacking Systems Limited, London, England, a British company Application June 26, 1939, Serial No. 281,284
In Great Britain July 6, 1938

9 Claims. (Cl. 103—25)

This invention relates to fluid pressure apparatus and particularly, although not essentially, to fluid pressure actuated jacking apparatus.

According to the invention a pump driven by an electric motor supplies fluid through an opening which can communicate with a fluid release opening controlled by a valve actuated by a rotary movement of a hand knob and axial movement of which knob effects closing of the electric motor circuit to operate the electric motor. The pump may be of the annular piston type about as described in the Specification of British Patent No. 464,822, and the casing of the electric motor may be bolted to the pump casting with the spindles of the pump and motor in axial alignment and connected together permanently.

The above-mentioned and other features of the invention will be hereinafter described and defined in the appended claims.

The invention will now be described by way of example with reference to the accompanying drawings, wherein:

Figure 5 is a side elevational view of the apparatus.

Figure 1:
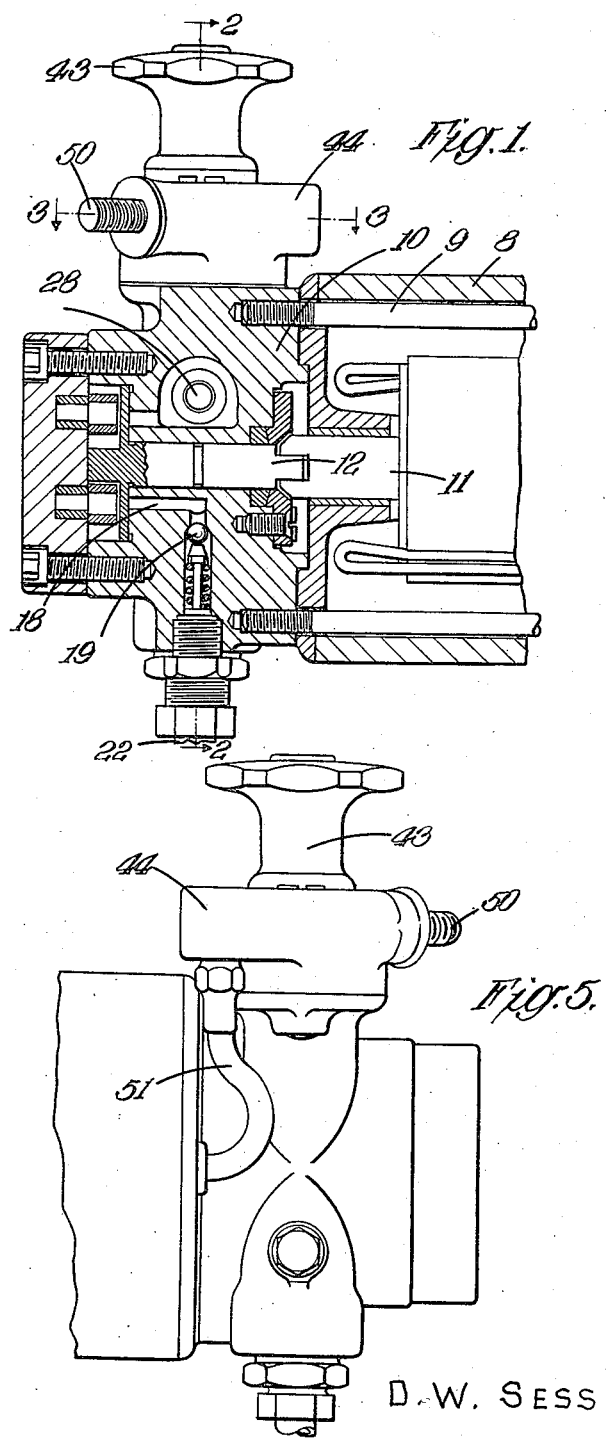
Figure 1 is a vertical sectional view (on line 1—1 on Figure 2) of an apparatus made in accordance with the invention.
Figure 2:
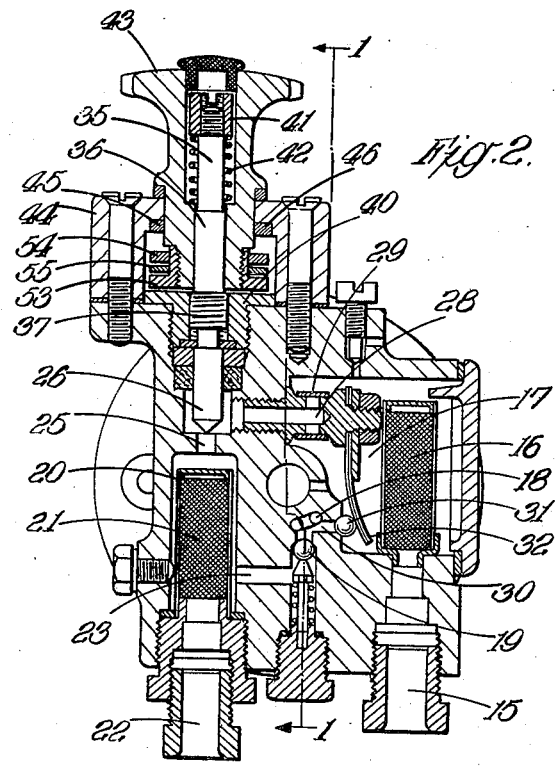
Figure 2 is a sectional view on line 2—2 on Figure 1.
Figure 3:
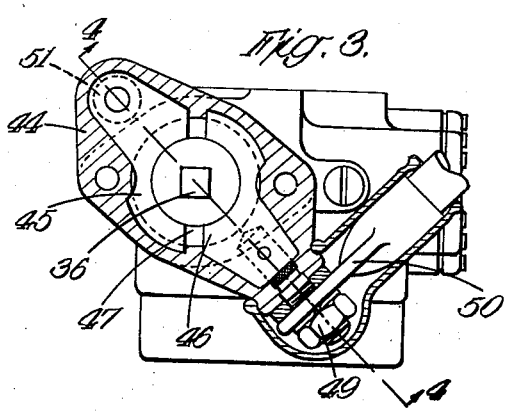
Figure 3 is a sectional view on line 3—3 on Figure 1.
Figure 4:
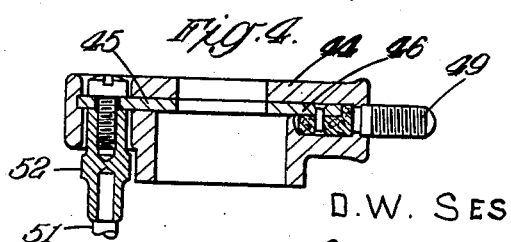
Figure 4 is a part sectional view on line 4—4 on Figure 3.

The electric motor 8 is bolted by bolts 9 to the pump casting 10, the motor spindle 11 being in axial alignment with and permanently or detachably connected to the spindle 12 of the pump which is of the annular piston type. Fluid enters the pump through an inlet pipe 15 and after passing through a filter 16 enters a chamber 17 from which it is drawn by the pump impellers and delivered through a port 18 past a non-return ball valve 19 and through a conduit 23 into an outlet bore 20 whence it passes through a filter 21 into an outlet pipe 22. The bore 20 has a continuation in the form of a port 25 which forms a valve seating for a needle valve 26. When this valve is open fluid can return through the port 25 and a valve member 28 past a rubber band 29 into the chamber 17. If a predetermined pressure is exceeded, fluid escapes from the delivery port 18 through a port 30 past a ball valve 31 controlled by a spring 32 into the chamber 17.

The valve needle is part of a spindle 35 that has a square section at 36 and a threaded part at 37. 38 is a rubber packing and 39 is a metal guide collar for the spindle. The threaded part 37 is screwed into a plug 40 which is screwed firmly into a recess in the pump casting. The square section part 36 fits slidably in a correspondingly shaped part of an axial hole in the valve operating knob 43 which is also guided in a casing cap or block 44 formed of insulating material and bolted on to the pump casing. The outlet bore 20, port 25, valve needle, spindle 35, and knob 43, are all in axial alignment. The spindle 35 extends outwardly into an axial hole in the knob 43 and has a collar 41 threaded on to its outer end. A spring 42 is located between an annular shoulder in this hole and the annular abutment surface on the spindle formed by the threaded collar. Located upwardly against an undercut annular surface in this block 44 are two conductor plates 45, 46, each somewhat less than half circular so as to leave two gaps 47, 48. Each plate has an extension, one of which (46) connects to the source of electricity supply by a terminal 49 and cable 50, and the other (45) to one terminal of the electric motor by a terminal 52 and cable 51. The other motor terminal is earthed. The plates are moulded in rigidly with the insulating material of the block 44 and terminals may also be moulded in, contacting with the plates and extending to outside of the block for attachment of the cables thereto. The inner or lower end of the knob 43 has a flanged retaining collar 53 screwed on to it between which and an annular abutment surface on the knob is a contact making conductor plate 54 supported by a resilient plate or spring washer 55. Rotation of the knob 43 effects rotary movement of the spindle 35 and valve needle and also axial movement of the latter by reason of the threads on the part 37. The knob can thus be rotated to open and close the valve. The knob can also be pulled up by sliding axially on the spindle against the action of the spring to complete the circuit through the conductor plates, and thus through the motor so as to drive the pump. The circuit is broken as soon as the knob is released by the action of the spring which presses the knob back to its normal position.

The fluid from the outlet pipe 22 passes to a fluid actuated apparatus, for example, to the motor car lifting jack described in the specification of my patent application Serial No. 281,283. When it is desired to extend the jack, the port 25 is closed and the pump is operated. The fluid will be maintained in the jack with the jack extended when the pump is no longer operating if the port 25 is kept closed. When the jack is to be collapsed, the port 25 is opened so that the fluid from the jack can return to its source through the parts 25, 29, 28, 17 and 15. The opening and closing of the valve 25, 26 thus determines whether fluid will be supplied to the jack or other apparatus, or maintained therein, or will be released therefrom.

I claim:

1. Fluid pressure apparatus comprising a pump having a fluid outlet opening and a fluid release opening in communication with the outlet opening, a valve for opening and closing the release opening, an electric motor adapted to drive the pump, contact members for opening and closing the electric circuit of the motor, a hand operable knob, means whereby axial movement of the knob engages the contact members to close the electric circuit, and means whereby rotary movement of the knob actuates the valve to open and close the release opening as required.

2. Fluid pressure apparatus comprising a pump having a fluid outlet opening and a fluid release opening in communication with the outlet opening, a valve for opening and closing the release opening, an electric motor adapted to drive the pump, a contact member in the electric motor circuit, a hand operable knob carrying said contact member, another contact member in the electric motor circuit, means whereby axial movement of the knob engages the contact members to close the electric circuit, and means whereby rotary movement of the knob actuates the valve to open and close the release opening when required.

3. Fluid pressure apparatus comprising a pump having a fluid outlet opening and a fluid release opening in communication with the outlet opening, a valve for opening and closing the release opening, an electric motor adapted to drive the pump, rigidly mounted contact members in the electric motor circuit which are permanently spaced apart, a movable contact member adapted to bridge the gap between the aforesaid two rigidly mounted contact members for opening and closing the electric circuit of the motor, a hand operable knob carrying said movable contact member, means whereby axial movement of the knob moves the movable contact member into engagement with the first mentioned two contact members to close the electric circuit, and means whereby rotary movement of the knob actuates the valve to open and close the release opening when required.

4. Fluid pressure apparatus comprising a pump having a fluid outlet opening and a fluid release opening in communication with the outlet opening, a valve member for opening and closing the release opening, an axially movable spindle carrying said valve member, said spindle and valve member being in axial alignment and said spindle having a threaded mounting, an electric motor adapted to drive the pump, contact members for opening and closing the electric circuit of the motor, a hand operable knob keyed to the aforesaid spindle whereby rotary movement of the knob effects rotation of the spindle which moves axially by reason of the threaded mounting so as to move the valve member to open and close the release opening, and means whereby axial movement of the knob in relation to the spindle engages the contact members to close the electric circuit.

5. Fluid pressure apparatus comprising a pump having a fluid outlet opening and a fluid release opening in communication with the outlet opening, a valve for opening and closing the release opening, an electric motor adapted to drive the pump, contact members for opening and closing the electric circuit of the motor, a hand operable knob, means whereby axial movement of the knob engages the contact members to close the electric circuit, and means whereby rotary movement of the knob actuates the valve through a screw-thread to open and close the release opening as required.

6. Fluid pressure apparatus comprising a pump having a fluid outlet opening and a fluid release opening in communication with the outlet opening, a valve member movable axially for opening and closing the release opening, a spindle carrying said valve member and in axial alignment therewith and said spindle having a threaded mounting, an electric motor adapted to drive the pump, contact members for opening and closing the electric circuit of the motor, a hand operable knob having a recess, said knob being keyed to the aforesaid spindle in axial alignment therewith, a spring surrounding said spindle and located in the said recess and serving normally to hold the knob in one position axially along the spindle, means whereby axial movement of the knob along the valve spindle against the action of the said spring engages the contact members to close the electric circuit, said knob being keyed to the spindle whereby rotary movement of the knob rotates the spindle which moves axially by reason of the threading and thereby moves said valve member to open and close the release opening.

7. Fluid pressure apparatus comprising a pump having a fluid outlet opening and a fluid release opening in communication with the outlet opening, a valve member for opening and closing the release opening, a spindle carrying said valve member and being in axial alignment therewith and having a threaded mounting whereby rotation of the spindle moves the valve member axially to open and close the release opening, an electric motor adapted to drive the pump, two rigidly mounted contact members in the electric motor circuit, said contact members being permanently spaced apart, a hand operable knob mounted on the said spindle in axial alignment therewith and having a recess, a spring within said recess located between the knob and an abutment on the spindle, a conductor member carried by the knob and adapted to engage the aforesaid two contact members when the knob is pressed along the spindle against the action of the said spring so as to close the electric circuit.

8. Fluid pressure apparatus comprising a pump of the annular piston type having a fluid outlet opening and a fluid release opening in communication with the outlet opening, a valve member for opening and closing the release opening, a spindle carrying said valve member and being in axial alignment therewith and having a threaded mounting whereby rotation of the spindle moves the valve member axially to open and close the release opening, an electric motor adapted to drive the pump, said electric motor being bolted to the pump casting with the spindles of the pump and motor in axial alignment and connected together permanently, two rigidly mounted contact members being permanently spaced apart, a hand operable knob mounted on the said spindle in axial alignment therewith and having a recess, a spring within said recess located between the knob and an abutment on the spindle, a conductor member carried by the knob and adapted to engage the aforesaid two contact members when the knob is pressed along the spindle against the action of the said spring so as to close the electric circuit.

9. Fluid pressure apparatus comprising a pump of the annular piston type having a spindle to be driven and having a fluid outlet opening and a fluid release opening in communication with the outlet opening, a valve for opening and closing the release opening, an electric motor adapted to drive the pump and bolted to the pump casting with the spindles of the pump and motor in axial alignment and connected together permanently, contact members for opening and closing the electric circuit of the motor, a hand operable knob, means whereby axial movement of the knob engages the contact members to close the electric circuit, and means whereby rotary movement of the knob actuates the valve to open and close the release opening as required.

DONALD WILFRED SESSIONS.